United States Patent [19]
Wright

[11] Patent Number: 5,107,665
[45] Date of Patent: Apr. 28, 1992

[54] SPATIAL GUIDE FOR ATTACHMENT TO A LINE TRIMMER

[76] Inventor: Randolph L. Wright, 5511 Twin Timbers, Arlington, Tex. 76018

[21] Appl. No.: 729,029

[22] Filed: Jul. 12, 1991

[51] Int. Cl.$^5$ .............................................. A01G 3/06
[52] U.S. Cl. ................................... 56/12.7; 30/275.4; 30/276; 56/DIG. 9
[58] Field of Search ...................... 56/12.7, 17.2, 17.4, 56/17.5, 322, 473.5, DIG. 9, DIG. 20; 172/13, 17; 30/272.1, 275.4, 276, 296.1, DIG. 5

[56] References Cited

U.S. PATENT DOCUMENTS

| | | | |
|---|---|---|---|
| 4,658,506 | 4/1987 | Nilsson | 30/275.4 |
| 4,756,084 | 7/1988 | Morita | 30/276 |
| 4,894,916 | 1/1990 | Nimz et al. | 30/DIG. 5 X |
| 5,048,187 | 9/1991 | Ryan | 30/276 |

*Primary Examiner*—David J. Bagnell
*Attorney, Agent, or Firm*—Charles W. McHugh

[57] ABSTRACT

A spatial guide adapted to be affixed to a gasoline-powered line trimmer (also called a string trimmer) to serve as a stand-off device, such that the cutting head of the trimmer cannot come any closer to an obstacle than is permitted by the length of a rigid arm. A rigid block of material having a central bore is configured to be attached to the trimmer's tube near the cutting head. The rigid arm attaches to the block of material, preferably by use of the same fasteners that hold the block to the tube. A slot in the arm permits selective adjustment of the distance by which the arm protrudes in a cantilevered manner from the block and hence from the tube. A large roller is mounted at the distal end of the rigid arm and serves to foster sliding and/or rolling movement between the arm and any obstacle adjacent which vegetation is to be cut—as the cutting head is manually moved past the obstacle. The preferred roller has a combination of diameter and thickness that will preclude it from passing between the openings in a conventional chain-link fence. A suitable size is a diameter of about two inches and a thickness in excess of two inches.

10 Claims, 2 Drawing Sheets

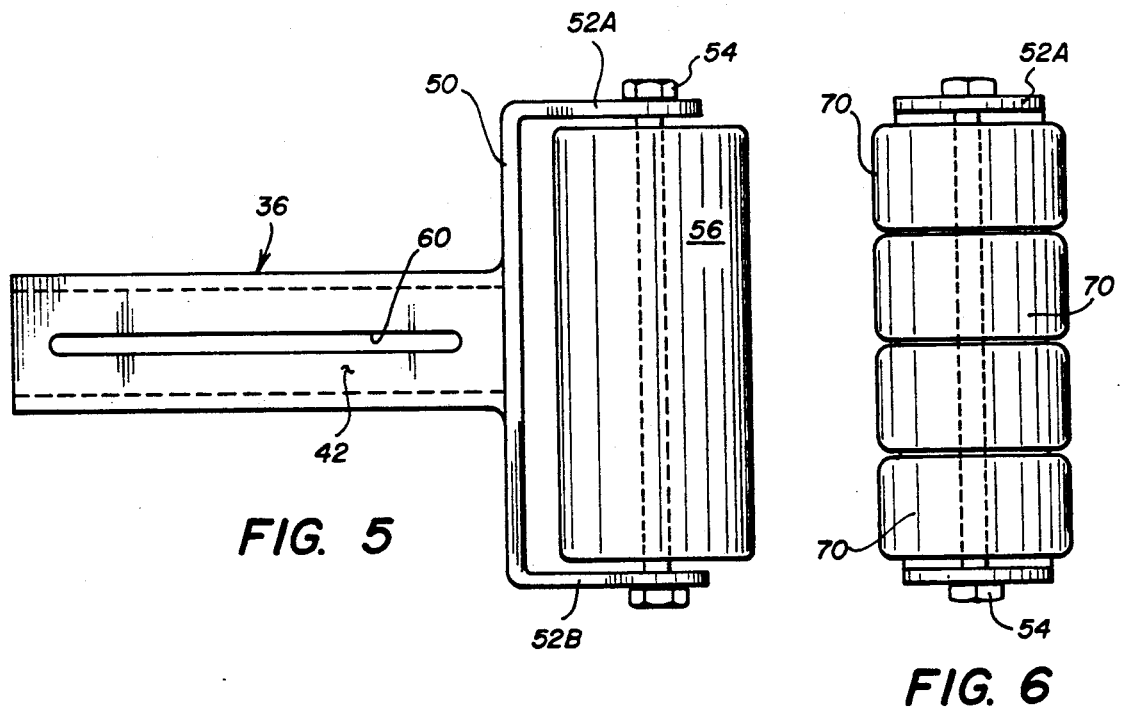
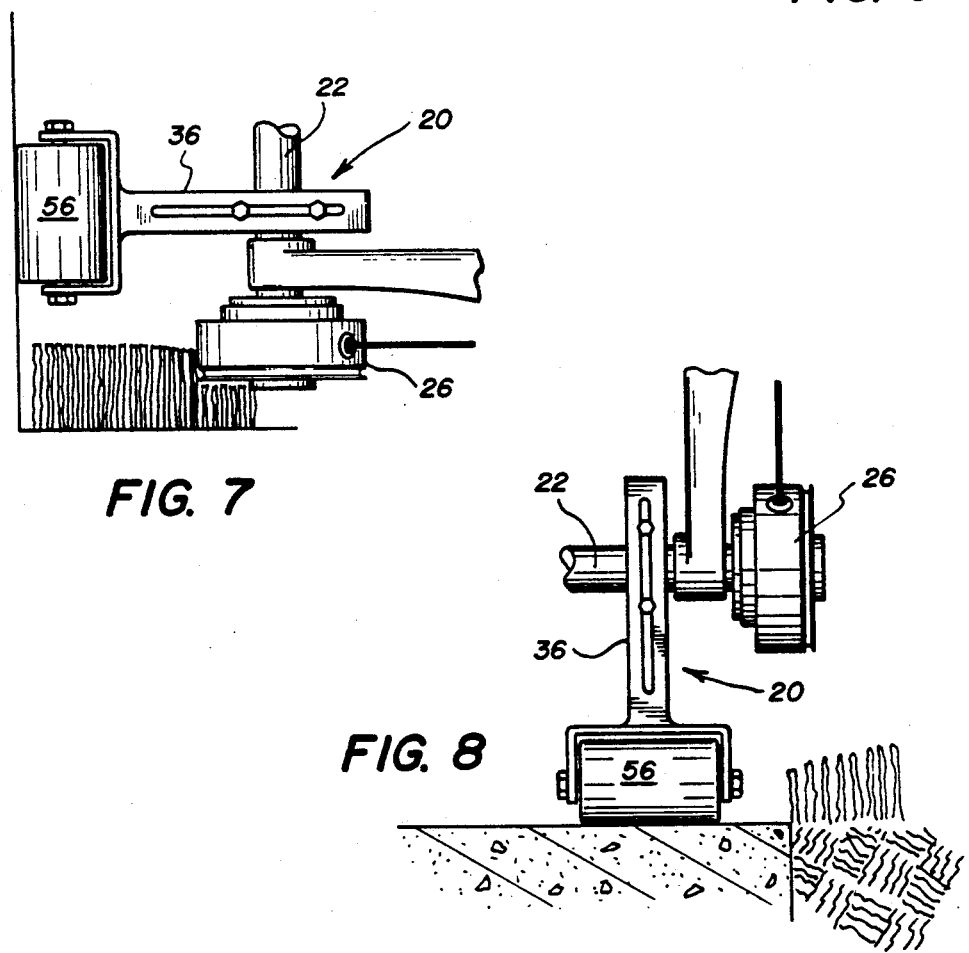

SPATIAL GUIDE FOR ATTACHMENT TO A LINE TRIMMER

BACKGROUND OF THE INVENTION

This invention relates generally to attachments for gasoline-powered lawn trimmers of the type that use a flexible cord as the active cutting element; more particularly, this invention relates to a device for attachment to that end of a gasoline trimmer which is adjacent the cutting head, for the purpose of maintaining the cutting head at a controlled distance away from a structure or an obstacle around which vegetation needs to be cut.

A powered device that has become very popular in recent years as a yard-care tool is a line trimmer, also sometimes called a string trimmer or cord trimmer. In such devices one or more flexible cords or strings, typically made of nylon or an extruded plastic, are extended for a few inches in a cantilevered manner from a head, and the head is caused to rotate by use of a power unit. When electricity is used to power such a device, an electric motor is mounted in the head, and a power cord extends from a handle through a hollow tube to the motor. When a small gasoline engine is used to power the unit, the engine is mounted near the handle and a rotatable drive cable extends through a hollow tube between the engine and the cutting head. Such vegetation trimmers have been manufactured and sold by many companies, but perhaps one of the best known of them has been The Weed Eater Company of Houston, Tex.

A practical problem in cutting grass and weeds with such devices has been that it is often difficult to manually support the cutting head adjacent some structure or obstacle at just the right position—to allow the rotating cord to come close enough to cut the vegetation but not close enough to impinge too vigorously on the structure or obstacle. For example, if the obstacle is a wire fence around a yard, there is no way that a rotating nylon cord is going to damage the steel fence if the head is accidentally brought too close to the fence. But the wire elements of the fence will act on the relatively soft nylon like narrow, elongated cutters when the rotating cord strikes them; and very soon it will be mandatory that an operator cause some fresh cord to be removed from a storage reel in order to be able to continue cutting vegetation. Even the heavy wires typically used in chain-link fence tend to act like cutting blades when the static wires are contacted by a cord that may be rotating at several hundred revolutions per minute. In fact, chain-link fencing is so notoriously harsh on the standard cord of a line trimmer that it is commonly said that such a fence "eats" nylon cord.

Another example of a vertically oriented structure adjacent which vegetation routinely grows is the wall of a building—such as a house or garage or barn. Of course, a segment of a solid wall will not usually act like a chopper on a nylon cord; but a rotating cord could damage the aesthetic appearance of a solid wall if the cutting head were brought too close or left too long in one position adjacent the wall. The relatively soft aluminum skirting that is frequently placed around the bottom of a mobile home is an example of a vertical member that is deserving of protection against repeated impact from a rotating line. It follows, therefore, that there has been a need for a spatial guide that will allow the cutting head of a gasoline-powered trimmer (also called a gas trimmer) to get close enough to do an effective cutting job on vegetation but not so close as to possibly damage a permanent structure or the trimmer itself.

In an effort to satisfy the above-described need, various devices have been proposed for attachment to line trimmers in order to render them more efficient. (Because the configurations of the cutting heads are significantly different on electrically powered trimmers and gas-powered trimmers, this disclosure will ignore electrically powered trimmers and concentrate on gas-powered trimmers.) Of the proposed attachments, most have addressed the problem of holding the cutting head so that it rotates about a horizontal axis that is a controlled distance above a medium that is to be cut, e.g., the grass along the edges of a sidewalk. An example of such a device is shown in U.S. Pat. No. 4,442,659 to Enbusk entitled "Dolly For Lawn Trimmer and Combination Thereof." Another device is shown in U.S. Pat. No. 4,803,831 to Carmine entitled "Attachment To A Lawn Trimmer." Still another device is shown in U.S. Pat. No. 4,981,012 to Claborn entitled "Apparatus for Converting a Gas-Powered Flexible Line Trimmer for Use as a Lawn Edger." A characteristic shared by all of these devices is that they probably work nicely for their intended uses, but they would not be ideal for use against a chain-link fence or a vertical wall. There has remained a need, therefore, for an economical, lightweight, simple device that can be readily attached to a flexible line trimmer in order to hold the cutting head a fixed distance away from any structure—whether that structure is horizontal (like a sidewalk) or vertical (like a fence). It is an object of this invention to provide such a device.

BRIEF DESCRIPTION OF THE INVENTION

In brief, the disclosed invention includes a rigid element in the form of a block of material having a curved surface that is configured to bear tightly against a section of the tube that extends between the gasoline engine and the cutting head. In its preferred form the rigid element has a relatively large central bore, and the curved surface forms a part of that bore. In its optimum form, the curved surface is generally cylindrical, having a radius that is just slightly less than 7/16 inch. Such a radius will cause the curved surface to closely match the diameters of most of the popular line trimmers that are commercially available at this time. When the rigid element is cut into two segments along a central plane through the cylindrical bore, the rigid element will be divided into two essentially equal parts.

A rigid arm formed from sheet metal or molded from a tough thermosetting plastic is configured for mating with the rigid element in such a way as to cause the arm to protrude outwardly from the tube in a cantilevered manner. Ideally the arm extends in a direction that is generally perpendicular to the tube. When the arm itself is generally planar, it is oriented so that the plane in which it lies will be perpendicular to the plane in which a cutting line rotates when power is delivered to the cutting head. This orientation fosters a compact, lightweight but rigid arm to be economically fabricated with a minimum amount of material.

A mechanical fastening means is used to hold together the two portions of the rigid element. A preferred form of the mechanical fastening means is a pair of bolts which pass through the two segments of the rigid element and engage a pair of nuts that are exposed at a surface of the rigid element. When a section of the tube is inserted between the two segments of the rigid element before the segments are connected together, the rigid element and the mechanical fastening means will function as a clamp to secure the rigid element to the trimmer's tube. In the preferred embodiment, the mechanical fastening means also performs another function; namely, it firmly connects the arm to the rigid element. And when the arm is provided with an appropriate slot, the relative position of the arm with respect to the rigid element can be affected by moving the arm to a desired place before the mechanical fastening means is tightened. Thus, the connection between the rigid element and the arm serves a double purpose: first, it establishes a definitive length between the tube and the distal end of the arm; second, it permits selective adjustment of that length, so that the user might choose exactly how close the cutting head is permitted to approach an obstacle or structure.

The device disclosed herein also has a large roller that serves as a means for fostering sliding and/or rolling movement between the distal end of the arm and any obstacle adjacent which vegetation is to be cut. The preferred roller is relatively large, and has a combination of diameter and thickness that will preclude it from passing between the openings in a conventional chain-link fence. That is, the roller is selected so that it will tend to roll over adjacent openings in such a fence instead of slipping into or through such openings. A preferred roller has a diameter of about two inches and a thickness (or length) of about two and one-quarter inches. Because of its large size, it is preferably supported by an axle that is connected to some supporting structure at both of its two ends. If a single roller is not available, a combination of several smaller rollers mounted side by side on a single axle may be used to provide a similar result.

BRIEF DESCRIPTION OF THE FIGURES OF THE DRAWING

FIG. 5 is a top plan view of the rigid arm and an attached roller;

FIG. 6 is a front elevational view of an arm showing a plurality of narrow rollers mounted on a common shaft to provide a result similar to that provided by a single large roller;

FIG. 7 is an elevational view of a line trimmer being used to cut vegetation in a horizontal plane next to a vertical wall; and FIG. 8 is an elevational view of a line trimmer being used to cut vegetation in a vertical plane next to a horizontal object such as a sidewalk.

DETAILED DESCRIPTION OF A PREFERRED EMBODIMENT OF THE INVENTION

Figure 1:
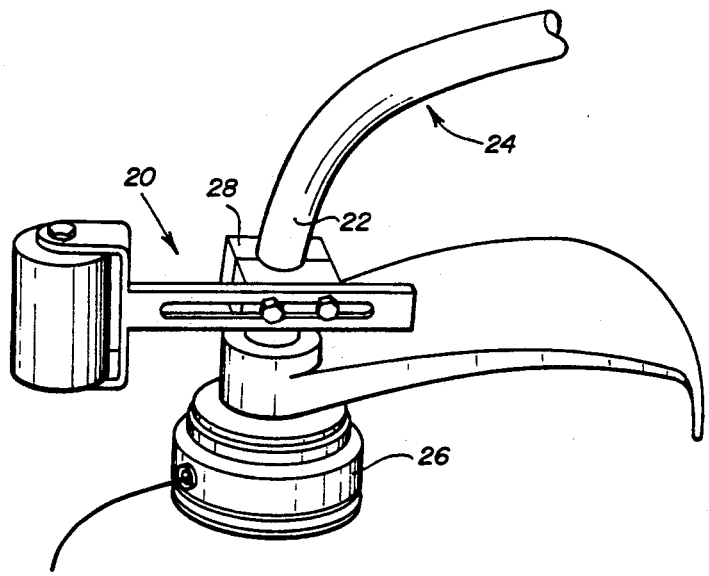
FIG. 1 is a perspective view of a spatial guide in accordance with the invention, shown attached to the tube of an exemplary gas-powered line trimmer.
Figure 2:
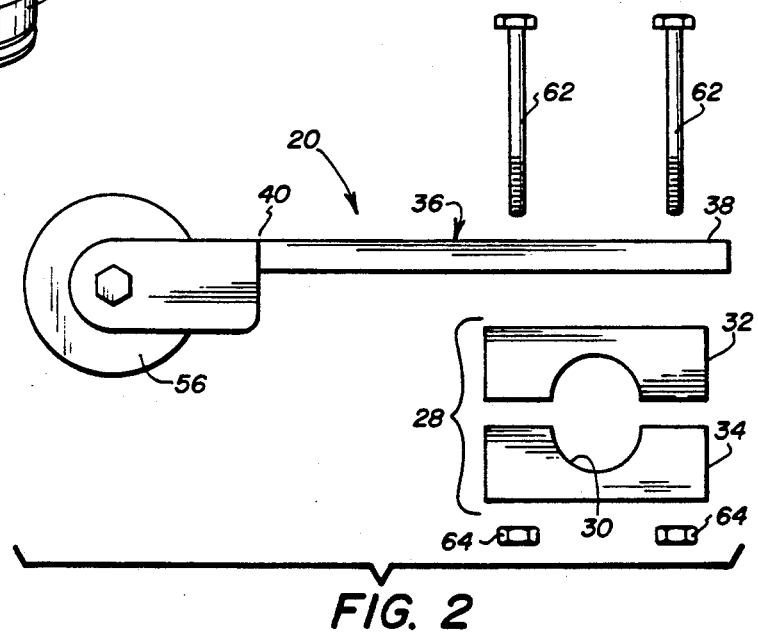
FIG. 2 is an exploded side elevational view of a spatial guide.

Referring initially to FIGS. 1 and 2, a spatial guide 20 in accordance with the invention is shown attached to the hollow tube 22 of a typical line trimmer 24 that is powered by a small gasoline-powered engine (not shown). As is well known to those skilled in the art, such a fuel-powered engine is mounted at the upper end of the trimmer 24, so that the trimmer may be more readily balanced in the hands of a user, and so that "balanced" placement of the distal cutting head 26 will be facilitated. The hollow tube 22 provides a structural connection between the cutting head 26 at one end and the engine at the other end, and also provides a protective sheath over the drive cable that extends between the engine and the head.

The tubes of most of the commercially available trimmers have a diameter of about ⅞ inch and they'll have substantial rigidity, but they are not indestructible. Hence, it is preferred that anything that is attached to the tube 22 be shaped and sized to preclude the application of a crushing or collapsing force on the tube when a rigid element 28 is secured to the tube. While the tube 22 needs to be tightly gripped in order to preclude relative movement between the element 28 and the tube, the gripping force should not be so severe as to cause a binding force to be applied to the internal cable (which must be free to rotate in order to drive the cutting head). To this end, the element 28 that grips the tube 22 has a curved interior surface 30 that provides wide-area contact with an external portion of the tube 22 near the cutting head. As is clearly visible in FIG. 2, the curved surface 30 preferably is established by creating in element 28 a generally cylindrical bore, the bore being centrally located and having a diameter of just slightly less ⅞ inch.

The element 28 is also divided into two segments by passing a cutting plane longitudinally through the axis of the cylindrical bore. For convenience in referring to these two segments, they will be designated as a first or interior segment 32, and a second or outer segment 34. The notations of "interior" and "exterior" are used to indicate the relative position of a given one of the two segments with respect to the tube 22 and a rigid arm 36. But other than their physical placement when the spatial guide 20 is being assembled, there need be no difference between them. Hence, the two segments 32, 34 may be identically constructed; and if they are molded from a thermosetting plastic material, a single injection molding die may be used to sequentially produce the two parts. Alternatively, if two cavities are provided in a single die, the two products produced by a single shot may be used interchangeably as segment 32 or 34.

The rigid arm 36 has a first end 38 and a second end 40, and will preferably have a length of about six inches. In use, the elongated arm 36 will extend outward from the tube in a cantilevered manner, and it will primarily be expected to experience compression loading. The arm 36 may also experience some torsional loading in the hands of a user who is not dedicated to preserving its life. The preferred arm 36 will also have a narrow central slot to accommodate certain mechanical fasteners (to be described). Because of these factors, it is believed that it will be advantageous to manufacture the arm 36 as a metal stamping; but it could also be molded as an injection molded part along with the segments 32, 34.

Figure 3:
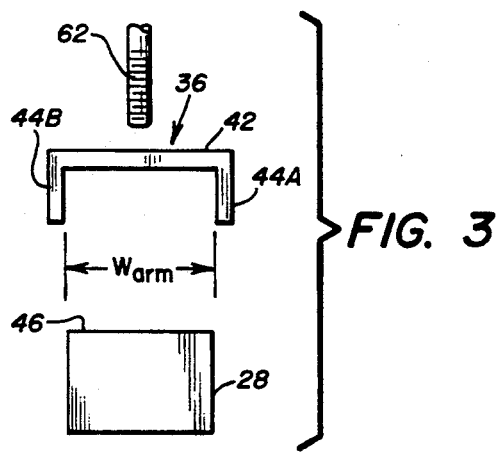
FIG. 3 is a partial, exploded rear elevational view of the guide, showing the relative positions of the arm and a segment of the rigid element that is used to affix the guide to a line trimmer.

Referring additionally to FIG. 3, it may be seen that the arm 36 has a long central body 42 and two spaced depending edges 44A, 44B. If a cutting plane should be passed transversely through the arm 36, it would be apparent that the arm could be described as having a generally U-shaped configuration. In FIG. 3, the separation distance between the two depending edges 44A, 44B is indicated by the notation $W_{arm}$. The width between confronting faces of the arm $W_{arm}$ is about one inch in the preferred embodiment—and is designed to be just slightly greater than the width of the immediately adjacent portion of the rigid element 28. Accordingly, it is possible to place the "interior" of arm 36 into a confronting relationship with at least one surface of the block 28 (which surface is identified by the numeral 46 in FIG. 3). This intimate, confronting relationship between the arm 36 and block 28 can be used to help prevent unwanted rotational movement between these two elements, especially when one or more depending edges 44A, 44B extend far enough to effectively block unwanted relative movement.

Figure 4:
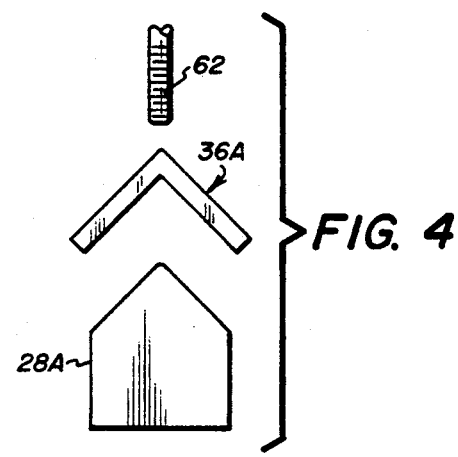
FIG. 4 is a view similar to FIG. 3 and showing an alternate embodiment of the arm and a V-shaped external surface of a segment of the rigid element.

Turning next to FIG. 4, an alternate embodiment of an arm and matching block is shown, wherein the arm 36A has a V-shaped cross-section instead of U-shaped. The included angle of the arm 36A is shown as ninety degrees, so it may be said that a transverse cross-sectional shape for both arm 36 and arm 36A includes two portions that intersect one another at an angle of ninety degrees. To foster intimate contact with the inside or "interior" surfaces of arm 36A, those two outer surfaces of element 28A that will confront the arm are similarly configured with a V-shaped hump that matches the shape and size of the arm 36A. This hump on element 28A and the V-shaped "interior" of arm 36A cooperate to preclude unwanted relative movement, i.e., rotational movement, between the two structures when they are held tightly together.

Turning next to FIG. 5, the second end of the arm 36 will now be considered. Forming a structural extension of arm 36 is a transverse piece 50 that extends in a direction that is approximately ninety degrees with respect to the body of the arm. Thus, the body of the arm 36 is relatively thin and flat as examined in a longitudinal direction, and the piece 50 forms a relatively wide piece when viewed in that same direction. If the arm 36 is made as a sheet metal stamping, the piece 50 may be integrally formed therewith, so that it naturally forms an extension of the arm; or the piece 50 may be formed separately and then rigidly attached to the body of the arm.

Extending in the same general direction as the body 42 are two spaced and generally parallel tabs or ears 52A, 52B. However, the tabs 52A, 52B are turned with respect to the plane of the body 42, so that the tabs may support the two ends of an axle 54. Upon this axle 54 is rotatably mounted a roller 56. Because of the selection of the angles of the various pieces that have been described, the roller 56 will be oriented so that it is generally parallel to the tube 22 of a line trimmer to which the device 20 is attached. Accordingly, properly attaching a device 20 to a trimmer (so that the arm 36 extends outwardly from tube 22) will cause roller 56 to serve as a stand-off device, preventing the cutting head 26 from getting any closer to an obstacle than will be permitted by the length of the arm and its associated roller. And moving the cutting head 26 sideways with respect to an obstacle will be facilitated by the rotation of the roller 56 about its supporting axle 54. Vegetation surrounding an obstacle can therefore be cut by a rotating line that extends from a cutting head 26, but the line cannot be consumed by destructive interference from the obstacle, especially if the obstacle is a wire fence or the like.

In order that a single device 20 may be serviceable on more than one brand or size of line trimmer, it is desirable that the relative position of the roller 56 with respect to a tube 22 be selectively adjustable. Such an adjustment may also be useful to accommodate the personal preference of a particular user. Hence, it is preferred that the physical connection between the rigid arm 36 and the rigid block 28 be achieved with an elongated slot 60 in body 42 and a pair of bolts 62 that pass through bores in block 28. The pair of bolts 62 and their companion nuts 64, of course, constitute part of a mechanical fastening means that serves a double duty: rendering the block 28 fixed with respect to the tube 22, and holding the arm 36 fixed with respect to block 28. That is, tightening the nuts 64 with respect to bolts 64 will serve to bring together the two segments 32, 34; this will grip the tube 22 tightly with an interior surface of the block 28 at the same time that the extension length of arm 36 (with respect to tube 22) is being set. By making the slot 60 about four inches long and making the separation distance between the two bolts 62 about one and one-half inches, a linear adjustment in stand-off length of about two and one-half inches is possible. Such a length (two and one-half inches) will usually be enough to accommodate all of the variations that are likely to be needed or desired with today's commercially available line trimmers.

Turning next to FIG. 6, an alternate embodiment is shown in which a plurality of narrow rollers 70 are placed side by side on a common axle 54 for the purpose of creating an effective roller whose peripheral surface is as wide as roller 56. The reason that a wide roller rather than a narrow one is preferred is that a wide roller will prevent a cutting head 26 from getting too close to an obstacle like a chain-link fence. That is, when a roller having a diameter of about two inches and a width (or thickness) of about two and one-quarter inches is used at the distal end of an arm 36, a user can easily "roll" a line trimmer alongside a vertical chain-link fence and cut any vegetation that is growing immediately next to the fence. In general, it can be stated that a roller's thickness (as measured in a direction that is parallel to the roller's axis of rotation) should be at least as great as, and preferably greater then, its diameter.

Another way of describing the preferred size of a roller in accordance with this invention is to think of the roller as having something which will be called a footprint—which is defined as the roller's diameter times its thickness (or height). If the footprint of a roller (or a series of combined rollers) is at least four and one-half square inches, then the guide 20 will tend to move easily past most—if not all—obstacles that are likely to be encountered in a yard, whether the obstacles be vertical or horizontal. This will be true because the large peripheral surface of the roller 56 will be in rolling contact with an obstacle when the cutting head is brought so near that contact with the obstacle is assured.

Referring next to FIGS. 7 and 8, it will be seen that the cutting head 26 can be pushed as close to an obstacle as the rigid arm 36 will permit; and this may be done while giving only scant attention to the obstacle itself. In other words, very careful attention to the relative position of the cutting head and the obstacle is not required, because the roller 56 will take care of fostering whatever relative motion is needed to protect the obstacle and the cutting line. The guide 20 may be permanently affixed to the tube 22 in a position opposite the shield that comes as a part of the original equipment with the trimmer. Even if the arm 36 and the transverse piece 50 and the structural members 52A, 52B are all made of metal, a typical guide 20 will weigh only about half a pound, because of its very compact size and its few parts. In these two factors alone, the device disclosed herein should be acknowledged to be an improvement over the devices shown in the earlier-cited patents.

The stand-off device 20 is also deemed to be an improvement over previously known devices in the manner in which the tube 22 is protected against being crushed as element 28 is affixed thereto. By making the element 28 in the form of a solid block, there will be ample area over which to distribute the gripping forces as the threaded fasteners 62 are tightened. The preferred shape for element 28 is that of a rectangular parallelepiped in which none of the multiple sides of the body exceeds the lengths of the other sides by more than 100 percent. Expressed in other words, the element 28 is preferably shaped as a rather chunky or compact member, and its interior curved surface 30 should be in excess of one square inch. And by dividing the element 28 into two equal segments 32, 34, each of which has its own curved surface 30 to bear against the tube 22, the gripping force of a tightly secured element is enhanced without introducing any risk of collapsing the tube. The curved surfaces 30 of two juxtaposed elements 32, 34 will provide a total contact area in excess of two square inches. And positioning the axle 54 so that compression forces which are passed through the roller will be almost directly in line with the tube should also help ensure that there will be little loading that might tend to loosen the bolts 62.

While only certain preferred embodiments of the invention have been disclosed herein in great detail, it should be apparent to those skilled in the art that variations and modifications could be made in certain of the recited structures without departing from the spirit of the invention. Accordingly, the invention should be understood to be limited only by the terms of the claims appended hereto.

What is claimed is:

1. A spatial guide for attachment to a powered trimmer of the type widely used in cutting vegetation as part of yard maintenance, said powered trimmer having a fuel-powered engine and a remote cutting head and a tube extending between the engine and the cutting head, and the cutting head supporting a flexible line in such a way that the line can be rapidly rotated by torque derived from the engine, and the rotating line being effective to cut grass and similar vegetation, comprising:
   a. a rigid element in the form of a block having at least one external surface and having at least one curved surface, said curved surface being shaped to bear intimately against a portion of the tube's exterior at a location near the cutting head, and the curved surface having an area in excess of one square inch in order to preclude any crushing action on said tube when the rigid body is pressed against the tube;
   b. a rigid arm having first and second ends and a length therebetween, said first end being shaped so that it may be placed in intimate contact with said at least one external surface of the rigid element, and the second end having a structural configuration that is adapted to both contact and foster easy movement past any obstacle that is surrounded by vegetation which needs to be cut, and wherein the second end of the arm includes a pair of spaced structural members for supporting an axle upon which a roller may turn, and further including a roller mounted at the second end of the arm so that the roller will contact an obstacle when the cutting head is brought close to the obstacle, and wherein the roller has an axis of rotation and a peripheral surface, and wherein the axis of rotation is oriented so that the roller's peripheral surface will be in rolling contact with an obstacle whenever the roller is moved past the obstacle while being in contact therewith; and
   c. mechanical fastening means for causing the curved surface of the rigid element to bear tightly against a portion of the tube in order to render the rigid element fixed with respect to the tube, and the second end of the arm extending in a cantilevered fashion away from the tube when the rigid element is fixed with respect to the tube, whereby the second end of the arm will function as a stand-off device that prevents the tube from coming any closer to an obstacle than is permitted by the length of the arm.

2. The spatial guide as claimed in claim 1 wherein the axis of rotation of the roller is parallel to the tube of a line trimmer to which the spatial guide is attached.

3. The spatial guide as claimed in claim 1 wherein the roller has a thickness and a diameter, and said thickness is measured in a direction that is parallel to the roller's axis of rotation, and wherein the thickness of the roller is appreciably greater than its diameter.

4. The spatial guide as claimed in claim 3 wherein the thickness of the roller is at least two inches.

5. A spatial guide for attachment to a powered trimmer of the type widely used in cutting vegetation as part of yard maintenance, said powered trimmer having a fuel-powered engine and a remote cutting head and a tube extending between the engine and the cutting head, and the cutting head supporting a flexible line in such a way that the line can be rapidly rotated by torque derived from the engine, and the rotating line being effective to cut grass and similar vegetation, comprising:
   a. a rigid element in the form of a block having at least one external surface and having at least one curved surface, said curved surface being shaped to bear intimately against a portion of the tube's exterior at a location near the cutting head, and the curved surface having an area in excess of one square inch in order to preclude any crushing action on said tube when the rigid body is pressed against the tube, and wherein the rigid element is shaped in the form of a block having multiple sides, and the length of none of the sides exceeds the length of the other sides by more than 100 percent, and wherein the block is divided into two major segments and said major segments have respectively confronting surfaces, and said curved surface constitutes a part of one of the confronting surfaces of a major segment, such that the curved surface lies between the two major segments of said block and may be aptly described as an interior surface;
   b. a rigid arm having first and second ends and a length therebetween, said first end being shaped so that it may be placed in intimate contact with said at least one external surface of the rigid element, and the second end having a structural configuration that is adapted to both contact and foster easy movement past any obstacle that is surrounded by vegetation which needs to be cut; and c. mechanical fastening means for causing the curved surface of the rigid element to bear tightly against a portion of the tube in order to render the rigid element fixed with respect to the tube, and the second end of the arm extending in a cantilevered fashion away from the tube when the rigid element is fixed with respect to the tube, whereby the second end of the arm will function as a stand-off device that prevents the tube from coming any closer to an obstacle than is permitted by the length of the arm.

6. A spatial guide for attachment to a powered trimmer of the type widely used in cutting vegetation as part of yard maintenance, said powered trimmer having a fuel-powered engine and a remote cutting head and a tube extending between the engine and the cutting head, and the cutting head supporting a flexible line in such a way that the line can be rapidly rotated by torque derived from the engine, and the rotating line being effective to cut grass and similar vegetation, comprising:

a. a rigid element in the form of a block having at least one external surface and having at least one curved surface, said curved surface being shaped to bear intimately against a portion of the tube's exterior at a location near the cutting head, and the curved surface having an area in excess of one square inch in order to preclude any crushing action on said tube when the rigid body is pressed against the tube, and wherein the rigid element is shaped as a rectangular parallelepiped, and said element is further divided into two substantially equal segments, and said at least one curved surface lies on the first one of the two segments where it faces the other of the two segments;

b. a rigid arm having first and second ends and a length therebetween, said first end being shaped so that it may be placed in intimate contact with said at least one external surface of the rigid element, and the second end having a structural configuration that is adapted to both contact and foster easy movement past any obstacle that is surrounded by vegetation which needs to be cut; and c. mechanical fastening means for causing the curved surface of the rigid element to bear tightly against a portion of the tube in order to render the rigid element fixed with respect to the tube, and the second end of the arm extending in a cantilevered fashion away from the tube when the rigid element is fixed with respect to the tube, whereby the second end of the arm will function as a stand-off device that prevents the tube from coming any closer to an obstacle than is permitted by the length of the arm.

7. The spatial guide as claimed in claim 6 wherein the rigid element has a second curved surface, and said second curved surface is on the second of the two segments and is positioned so as to be juxtaposed with the first curved surface.

8. The spatial guide as claimed in claim 6 wherein the mechanical fastening means includes a pair of threaded fasteners that extend through both of the two segments.

9. A spatial guide for attachment to a powered trimmer of the type widely used in cutting vegetation as part of yard maintenance, said powered trimmer having a fuel-powered engine and a remote cutting head and a tube extending between the engine and the cutting head, and the cutting head supporting a flexible line in such a way that the line can be rapidly rotated by torque derived from the engine, and the rotating line being effective to cut grass and similar vegetation, comprising:

a. a rigid element in the form of a block having at least one external surface and having at least one curved surface, said curved surface being shaped to bear intimately against a portion of the tube's exterior at a location near the cutting head, and the curved surface having an area in excess of one square inch in order to preclude any crushing action on said tube when the rigid body is pressed against the tube;

b. a rigid arm having first and second ends and a length therebetween, said first end being shaped so that it may be placed in intimate contact with said at least one external surface of the rigid element, and the second end having a structural configuration that is adapted to both contact and foster easy movement past any obstacle that is surrounded by vegetation which needs to be cut and wherein the second end of the arm has a roller mounted thereon in order to form what may be described as a physical extension of the arm, and the roller is oriented so that a peripheral surface of the roller will contact an obstacle when the cutting head approaches the obstacle, and wherein the roller has a substantial size such that its footprint is at least four and one-half square inches, said footprint being defined by the diameter of the roller multiplied by its thickness; and c. mechanical fastening means for causing the curved surface of the rigid element to bear tightly against a portion of the tube in order to render the rigid element fixed with respect to the tube, and the second end of the arm extending in a cantilevered fashion away from the tube when the rigid element is fixed with respect to the tube, whereby the second end of the arm will function as a stand-off device that prevents the tube from coming any closer to an obstacle than is permitted by the length of the arm.

10. A spatial guide for attachment to a powered trimmer of the type widely used in cutting vegetation as part of yard maintenance, said powered trimmer having a fuel-powered engine and a remote cutting head and a tube extending between the engine and the cutting head, and the cutting head supporting a flexible line in such a way that the line can be rapidly rotated by torque derived from the engine, and the rotating line being effective to cut grass and similar vegetation, comprising:

a. a rigid element in the form of a block having at least one external surface and having at least one curved surface, said curved surface being shaped to bear intimately against a portion of the tube's exterior at a location near the cutting head, and the curved surface having an area in excess of one square inch in order to preclude any crushing action on said tube when the rigid body is pressed against the tube;

b. a rigid arm having first and second ends and a length therebetween, said first end being shaped so that it may be placed in intimate contact with said at least one external surface of the rigid element, and the second end having a structural configuration that is adapted to both contact and foster easy movement past any obstacle that is surrounded by vegetation which needs to be cut and wherein the rigid arm has a U-shaped cross-section when examined in a transverse plane, and wherein the U-shaped cross-section is established by two depending edges that extend in the same direction from a central body, and wherein the separation distance between the two depending edges is only slightly greater than the width of said external surface of the rigid element, whereby the rigid arm may be placed in contact with said external surface of the rigid element and the depending edges of the arm will preclude any rotative movement between the arm and the rigid element; and c. mechanical fastening means for causing the curved surface of the rigid element to bear tightly against a portion of the tube in order to render the rigid element fixed with respect to the tube, and the second end of the arm extending in a cantilevered fashion away from the tube when the rigid element is fixed with respect to the tube, whereby the second end of the arm will function as a stand-off device that prevents the tube from coming any closer to an obstacle than is permitted by the length of the arm.

* * * * *